No. 668,532. Patented Feb. 19, 1901.
F. J. & C. A. MACCARTHY.
MULTIPLYING PLATE HOLDER FOR CAMERAS.
(Application filed May 17, 1900.)
(No Model.)
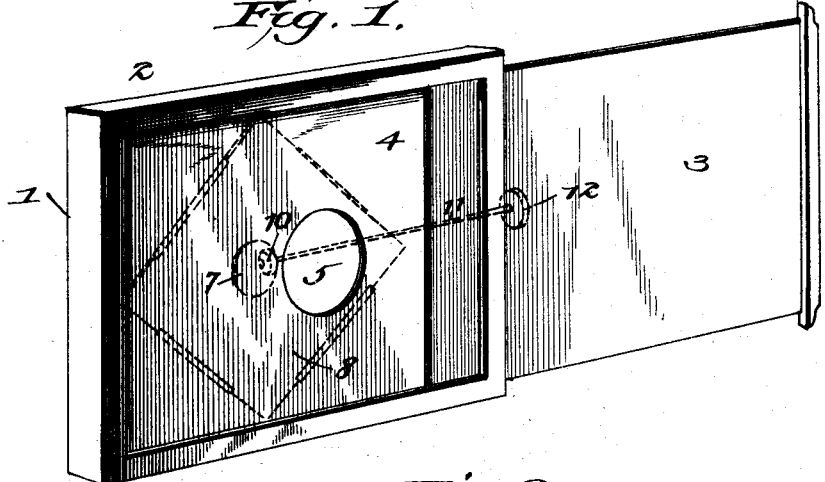
Fig. 1.
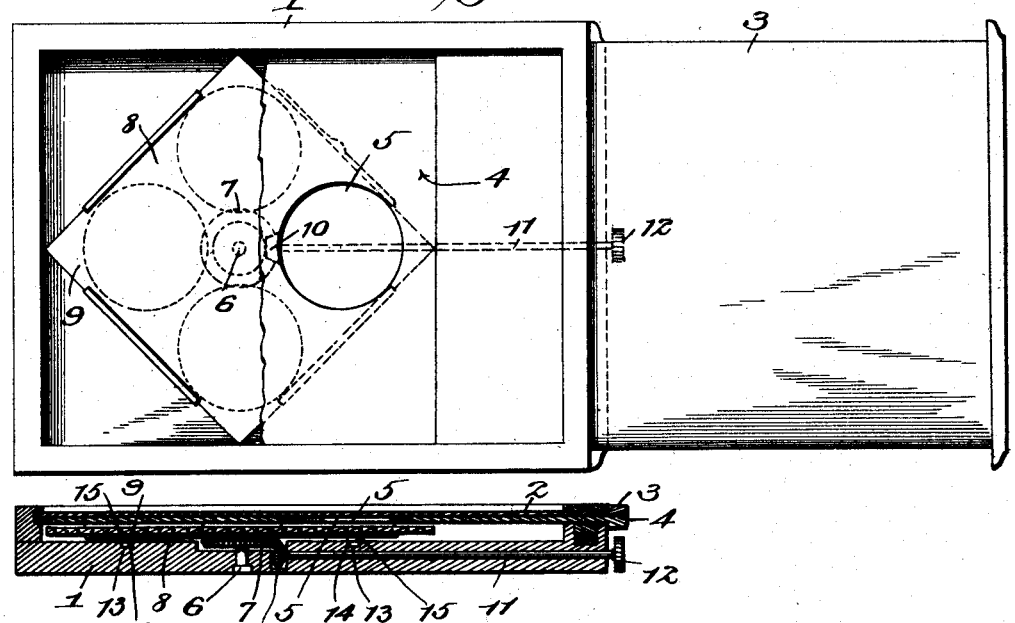
Fig. 2.
Fig. 3.
Fig. 4.
Witnesses
Inventors
Frank J. Maccarthy,
Charles A. Maccarthy,
By
Attorneys

UNITED STATES PATENT OFFICE.

FRANK J. MACCARTHY AND CHARLES A. MACCARTHY, OF OGDEN, UTAH.

MULTIPLYING-PLATE HOLDER FOR CAMERAS.

SPECIFICATION forming part of Letters Patent No. 668,532, dated February 19, 1901.

Application filed May 17, 1900. Serial No. 17,287. (No model.)

*To all whom it may concern:*

Be it known that we, FRANK J. MACCARTHY and CHARLES A. MACCARTHY, citizens of the United States, residing at Ogden, in the county of Weber and State of Utah, have invented a new and useful Rotary Plate-Holder for Cameras, of which the following is a specification.

Our invention relates to plate-holders for cameras, and has for its object to produce a device of this kind by means of which more than one exposure can be made upon the same plate, thereby enabling the operator to make separate and distinct pictures of the same object or person in different positions upon the same plate.

With this object in view our invention consists in the improved construction and novel arrangement of parts of a plate-holder for cameras, as will be hereinafter more fully set forth.

In the accompanying drawings, in which the same reference-numerals indicate corresponding parts in each of the views in which they occur, Figure 1 is a perspective view of a plate-holder embodying our invention, with the dark slide removed ready for making an exposure. Fig. 2 is a plan view of the same. Fig. 3 is a longitudinal sectional view. Fig. 4 is an enlarged perspective detail view of the plate-holder.

Referring more particularly to the drawings, 1 indicates the frame of the plate-holder, which may be of the usual size to fit in the ordinary camera, the sides of which are provided with grooves 2, within which are movably mounted two slides 3 and 4. The outer slide 3 is similar to the ordinary dark slide; but the inner slide 4 is provided with an opening 5 substantially at its center and of a size to correspond with the size of the picture to be taken.

Pivotally secured to the back of the holder-frame by means of a pivot 6 is a bevel-gear 7, to the outer end of which is permanently secured a plate-holder 8. Three sides of the plate-holder, which is preferably formed from a sheet of thin metal, are bent or curved over to form grooves for the reception of the plate 9, which can be inserted from the ungrooved side. The size of the plate to be used in the holder is regulated by the width of the holder-frame, which must be equal to a line drawn diagonally across the plate—that is, the corners of the plate must not engage with the sides or bottom of the holder-frame.

The opening 5 in the inner slide is so adjusted relatively to the pivot 6 that when the plate stands with one corner behind the opening an exposure made at that time will cause a picture to appear in that corner of the plate. By giving the plate a partial rotation upon the pivot, so as to cause another corner of the plate to appear behind the opening, the operator will be enabled to make a second exposure upon the plate without affecting the first exposure. A further rotation of the plate will permit of an exposure being made upon each corner of the plate without affecting any of the others, thereby permitting of four exposures being made of the same object in different positions upon the same plate, all of which may be developed at the same time and from which pictures may be secured with one printing.

The rotation of the plate is effected by means of a bevel gear-wheel 10, secured to the inner end of a rod or shaft 11, the outer end of which projects above the top of the holder-frame and is provided with a thumb-nut 12. The back of the plate-holder frame is provided with an annular groove 13, concentric with the pivot-pin 6, within which are seated spring-catches 14, preferably four in number. The free end of each of the catches projects above the top of the groove in position to engage with stops 15 on the bottom of the plate-holder 8. The stops 15 are so arranged upon the plate-holder that just as they pass over the free ends of the springs within the grooves the plate will be in proper position for exposure, thereby enabling the operator to determine by the sound of the spring in passing over the stops when the plate is in proper position and to cease the further rotation of the plate-holder.

In using our improved plate-holder the two slides are removed from the holder and the sensitized plate is inserted into the holder at the back of the holder-frame in the dark room in the ordinary manner and the two slides inserted to exclude the light. When it is desired to make an exposure, the outer slide is withdrawn and the shutter of the camera is operated in any suitable manner, which will cause an exposure of the plate through the opening in the inner slide in the same manner as though the entire plate were exposed to the action of the light. The plate is then given a partial rotation and a succeeding exposure secured and the process repeated until the plate has been exposed at all points. The dark slide is then reinserted and the holder and its frame removed from the camera and developed in the ordinary manner.

Although we have shown what we consider the best means for constructing our improved plate-holder, yet we reserve the right to make such changes and alterations therein as will come within the scope of our invention.

Having thus fully described our invention, what we claim as new, and desire to secure by Letters Patent, is—

1. In a plate-holder for cameras, the combination, with a holder-frame, of a flanged plate-holder rotatably mounted in the frame for movably holding a sensitized plate, two slides for the holder, the inner one of which is provided with an opening of a less area than the area of the plate to be exposed, substantially as described.

2. In a plate-holder for cameras, the combination, with a holder-frame provided with means for movably holding a sensitized plate thereto, of two slides, the inner one of which is provided with an opening of a less area than the area of the plate, and an operating-rod mounted in the holder and projecting beyond the edge thereof for successively moving different portions of the plate to the rear of said opening, substantially as described.

3. In a plate-holder for cameras, the combination, with a frame, of a plate-holder journaled to the rear thereof and provided with a gear-wheel, two slides, the inner one of which is provided with an opening, a rod in the back of the holder, the inner end of which is provided with a gear-wheel to engage with the gear-wheel on the plate-holder, and the outer end is provided with a thumb-nut, substantially as described.

4. In a plate-holder for cameras, the combination, with a frame, of a plate-holder pivotally secured thereto, the back of the plate being provided with stops, spring-catches for engaging with said stops, means for rotating the holder, and two slides, the inner one of which is provided with an opening of a less area than the area of the plate to be exposed, substantially as described.

5. In a plate-holder for cameras, the combination, with a frame, the back of which is provided with an annular groove, of springs seated in said grooves, the free ends of which extend above the top thereof, a pivot located centrally within said groove, a bevel-wheel on said pivot, a plate-holder secured to said wheel, the back of which is provided with stops in position for engaging with said springs, a rod journaled in the frame, the inner end of which is provided with a bevel-wheel in engagement with the first-mentioned bevel-wheel and the outer end is provided with a thumb-nut, and two slides, the inner one of which is provided with an opening of a less area than the area of the plate to be exposed, substantially as described.

6. In a plate-holder for cameras, the combination, with a frame, of a plate-holder journaled to the back thereof, the three edges of said holder being curved forward for the reception of the plate, the fourth edge being uncurved, and the rear of the plate being provided with stops, spring-catches for engaging with said stops, means for rotating the holder, and two slides, the inner one of which is provided with an opening to register with a portion only of the sensitized plate, substantially as described.

FRANK J. MACCARTHY.
CHARLES A. MACCARTHY.

Witnesses:
J. J. BRUMMITT,
S. S. SMITH.